United States Patent [19]
Learned

[11] Patent Number: 5,146,386
[45] Date of Patent: Sep. 8, 1992

[54] ELECTRONIC MONITORING AND REDUNDANT CONTROL CIRCUIT FOR A POWER SWITCH

[75] Inventor: Edward B. Learned, Fort Branch, Ind.

[73] Assignee: Potter & Brumfield, Inc., Princeton, Ind.

[21] Appl. No.: 622,881

[22] Filed: Dec. 5, 1990

[51] Int. Cl.⁵ ............................................. H02H 3/24
[52] U.S. Cl. ...................................... 361/91; 361/56; 361/100
[58] Field of Search ............... 361/56, 91, 100, 104, 361/18, 54, 88, 115; 340/248

[56] References Cited
U.S. PATENT DOCUMENTS

| | | | |
|---|---|---|---|
| 4,038,584 | 7/1977 | Tarchalski | 361/104 |
| 4,271,448 | 6/1981 | Pond | 361/93 |
| 4,882,782 | 11/1989 | Kimizuka | 361/104 |

Primary Examiner—Steven L. Stephan
Assistant Examiner—Adolf Berhane
Attorney, Agent, or Firm—Joseph S. Codispoti; Eugene S. Indyk

[57] ABSTRACT

A protective circuit for removing power from a load detects the presence of a control signal which causes electrical power to be delivered to a load, for example, via a controlled switching device such as an electromechanical relay or a solid state relay. The protective circuit also detects the presence of voltage across the load, signifying that the controlled switching device is causing power to be supplied to the load. The protective circuit removes power form the load when there is an absence of control signal and there is voltage across the load, indicating a failure of the controlled switching device.

21 Claims, 2 Drawing Sheets

5,146,386

ELECTRONIC MONITORING AND REDUNDANT CONTROL CIRCUIT FOR A POWER SWITCH

BACKGROUND OF THE INVENTION

This invention relates to an electronic monitoring and redundant control circuit for a load carrying power switch which may be a semiconductor switch, for example, a semiconductor switch in a solid state relay for switching AC or DC load current. The load carrying power switch may also be an electromechanical relay or contractor or a controlled mechanical switch.

Generally, solid state switching devices for switching AC load current use, for example, a triac or a pair of thyristors in inverse parallel connection, as a load carrying switch. This switch is controlled, e.g., by an input current signal applied through an optocoupler. For turning off the load carrying switch, the control signal is removed, and the power switch turns off near the next zero crossing of the AC current. However, problems may occur, for example, with switching off inductive loads, which shift the phase between voltage and current by up to ninety degrees.

In these cases, the semiconductor power switch, in particular a triac, may fail to turn off reliably. In any case, independent of the kind of load, a semiconductor switch can be defective. Due to a failure of the semiconductor switch, AC or DC load current can continue to flow even in the absence of an input control signal.

Similar problems can also arise with electromechanical switching devices, since mechanical contacts sometimes can weld closed.

SUMMARY OF THE INVENTION

It is an object of the present invention to provide a monitoring or watchdog circuit which will remove power from the load if, in the absence of input control signal, the load carrying power switch continues to conduct load current in either or both directions.

In accordance with an example of the present invention, the above mentioned problem is solved with a monitoring and redundant control circuit for a load carrying power switch comprising:

a pair of power supply terminals;

a pair of load terminals for connecting a load to a power switch connected in series with the load terminals across the power supply terminals;

a pair of control input terminals;

a control circuit connected to the control input terminals for switching the power switch in response to a control signal being present at the control input terminals;

an interrupting means connected in series with the power switch and load terminals; and circuit means for detecting the presence of voltage across the load terminals and the presence of a control signal across the control input terminals, the detector circuit actuating the interrupting means to interrupt the series connection between the power supply terminals and the load in the absence of a control signal, if voltage is still present across said load terminals.

One application of the invention is a monitoring and redundant control circuit for a semiconductor power switch in a solid state relay. If the switch is intended to switch AC load current, not only the power switch but also a detector output actuating said interrupting means must be designed to switch AC. Generally, the interrupting means can use electronic switching means or electromechanical means, as well. The circuit which detects AC load voltage may include a rectifier bridge.

The input control signal which is applied to the power switch as well as to the detector circuit may be a continuous DC current signal in one embodiment. In this case, input LEDs of a pair of optocouplers for power switch control and for input detecting may be connected in series across the control input terminals. In this case, the amount of current has to be such that the input LEDs are not damaged by the amount of current flowing through them.

In cases where a control circuit for the power switch, e.g. a control coil for a contactor, might require a higher level of current for normal operation, it is preferable to provide two separate, independent paths for the power switch control and the monitor/redundant control circuit, respectively.

In this case, the control signal across the control input terminals is a voltage signal, and the current for controlling the power switch may be high while the current applied to the detector circuit, e.g., an input LED, can be largely controlled by impedances connected with the LED.

With this voltage controlled configuration, an AC voltage may be used as an input control signal. By using an appropriate circuit of an input LED to the detector circuit with parallel and series impedances and an inverse diode, a capacitor may be discharged every other half-cycle of the AC. The time constant of the capacitor and its charging impedance has to be rated so long that the device cannot react in a half-cycle of the AC line frequency.

DETAILED DESCRIPTION OF THE INVENTION

Figure 1:
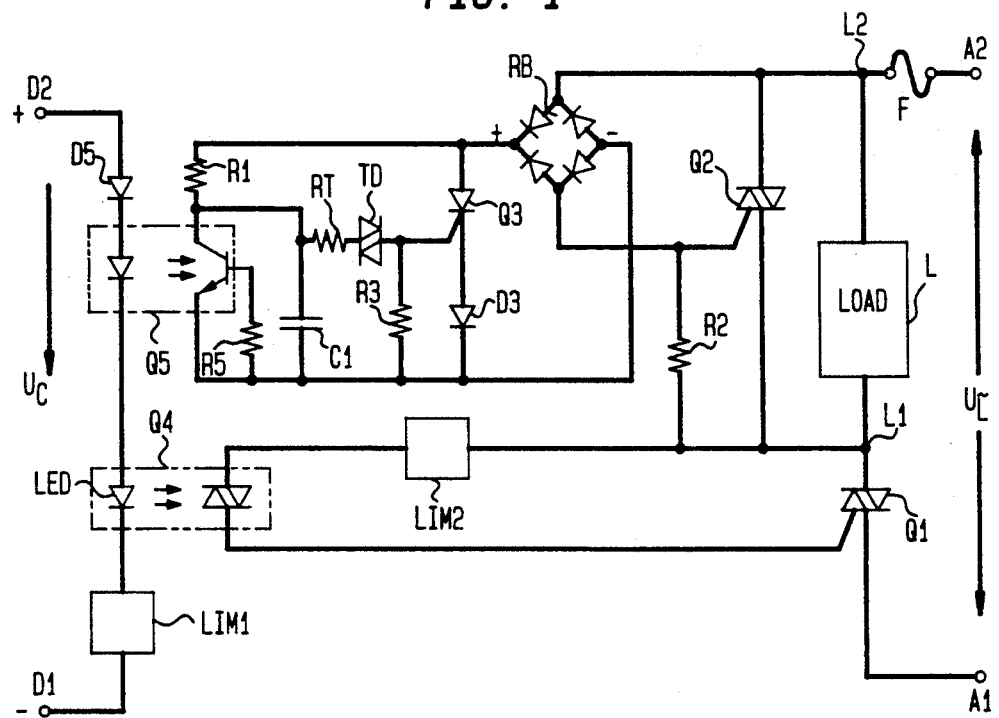
FIG. 1 is a schematic diagram of a monitoring circuit according to a first embodiment of the invention with DC control for an AC semiconductor power switch.

The circuit of FIG. 1 is a solid state relay including a semiconductor power switch, which may be a triac or inverse parallel SCR's Q1, for switching AC current for a load L. AC voltage $U_L$ is applied across first and second AC input terminals A1 and A2, respectively. DC voltage $U_C$ for providing a control current is applied across first and second DC input terminals D1 and D2, respectively. The load L is connected across first and second load terminals L1 and L2, respectively, and in series with the power switch Q1.

A control circuit for the power switch Q1 comprises a first optocoupler Q4, the input path of which is an LED and is connected in series between the DC input terminals D1 and D2. The output path of Q4 is formed by a phototriac which is connected so as to turn on and off the load power switch Q1. Generally known current limiters LIM1 in the DC input circuit and LIM2 in the control circuit may be provided for protecting the semiconductors against overcurrent.

A monitoring and controlling circuit comprises a short-circuiting power switch Q2 connected across the load terminals L1 and L2, a DC detecting second optocoupler Q5, an AC detecting rectifier bridge RB, a capacitor C1, and a trigger diode or diac TD which are connected so as to short out the load if AC load current is flowing in the absence of control signal. For this purpose, the rectifier bridge is connected with its input across the gate and one main terminal of the triac Q2, while its output is connected across a series connection of the capacitor C1 and a timing resistor R1. The gate of power switch Q2 is also connected through a resistor R2 to the first load terminal L1 and the other main terminal of Q2.

An input LED of the second optocoupler Q5 is connected in series with the LED of Q4 across the control terminals D1 and D2, while the output of Q5 which is a phototransistor which may have a base impedance such as resistor R5, with a connection to the capacitor C1 as shown in FIG. 1. A switching device, such as a thyristor Q3 is connected across the output terminals of the rectifier bridge, in series with a rectifying means, such as a diode D3. The gate of the switching device may be connected to one terminal of a trigger diode or diac TD. The other terminal of the diode or diac TD serves as a trigger input and may be connected through a current limiting means, such as a resistor RT, to the capacitor C1 and the resistor R1. The gate of the switching device Q3 may be further connected through another current limiting means such as a gate resistor R3 to the junction of the rectifier bridge RB, diode D3, and capacitor C1.

In operation, input current is present in the LEDs of Q4 and Q5. Q4 fires the triac Q1 and Q1 impresses the AC load voltage across the load L. In the monitoring circuit, all the input DC current which flows through Q4's LED also flows through Q5's LED, keeping the phototransistor of Q5 turned on. Q2 remains off, so the load voltage appears across Q2's gate to the opposite main terminal of Q2 which is tied to A2. Rectifier bridge RB rectifies the AC into full-wave rectified nonfiltered DC. This voltage appears at the top of R1. As long as input current continues to flow, Q5 remains on, keeping C1 discharged.

The trigger diode TD therefore remains off. This trigger diode, e.g. a silicon trigger switch, is basically an avalanche device with breakback or voltage collapse It remains in a high impedance state unless a sufficient voltage is impressed across it which exceeds its trigger voltage. When that happens, TD will fire and switch to a low impedance state.

In the circuit of FIG. 1, when the DC input current is interrupted, the phototransistor in the optocoupler Q5 will turn off and C1 will begin to charge. If Q1 is working properly, it will turn off near the next zero-current crossing. When or if it does turn off, the voltage across the load will substantially disappear, and C1 will stop charging. The next time DC input current arrives, Q5 will discharge the capacitor C1.

If Q1 fails to turn off in response to the DC input current being removed, Q5 turns off, allowing C1 to charge and voltage continues to be impressed across the load and the parallel triac Q2. Voltage also continues to be available at the positive output of RB. This voltage may be half-wave or full-wave, depending on the failure mode of Q1. Since C1 has no discharge path, the charge on it is cumulative. If C1 charges to the trigger voltage of the trigger diode TD, the thyristor Q3 is fired, which fires Q2 and shorts out the load L. The RT/C1 discharge time constant has to be set so that Q3 is continuously gated for a time greater than one half cycle of the AC line. That assures that Q2 can conduct for at least two consecutive half-cycles. That assures that if Q1 is shorted in either direction, Q2 will short out the load L and blow a fuse F or open a circuit breaker, disconnecting the AC line from the load.

A rectifier D5 in the input of the monitoring circuit may be included to make the input connection foolproof. If there is no LED current in Q5 and at the same time there is some load voltage, C1 will charge, the trigger diode TD will fire, and Q2 and Q3 will turn on.

Figure 2:
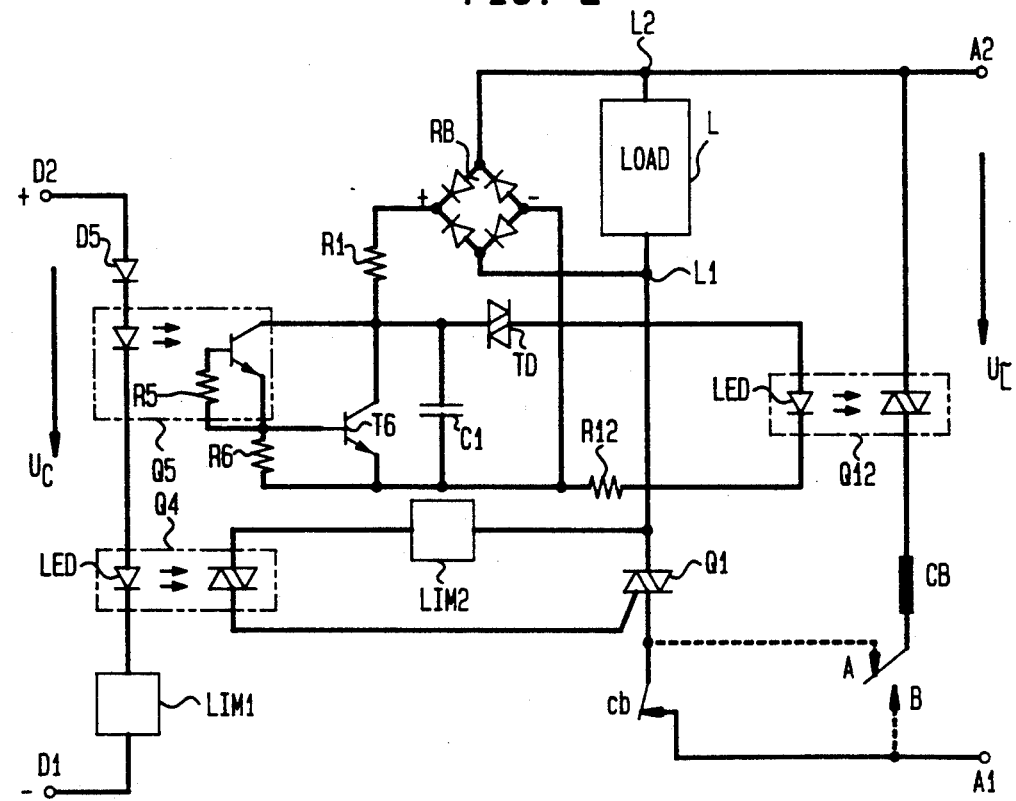
FIG. 2 is a schematic diagram of a circuit according to a second embodiment of the invention.

FIG. 2 shows a variation of the scheme illustrated in FIG. 1. All the parts with the same function have the same reference symbols as in FIG. 1.

In this embodiment, a circuit breaker CB with an auxiliary trip coil is used for disconnecting the load. These units can act like a relay, where a small (coil) current can cause the breaker to interrupt a large (load) current path. In this case, the output stage of the monitoring/redundant control device only has to handle milliamps.

As shown in FIG. 2, a circuit breaker CB is connected in series with the output of a third optocoupler Q12 across the AC input terminals and in parallel to the series connection of the load L and the power switch Q1. The output path of Q12 is a phototriac while its input LED is connected in series with the trigger diode TD and a resistor R12 across the capacitor C1.

As in the circuit of FIG. 1, the trigger diode TD is the detector stage. The time it takes for C1 to charge through R1, to the TD trigger voltage, is a function of both the failure mode of the power switch Q1, and the voltage of the AC voltage source. Accordingly, the values of C1 and R1 have to be determined based upon these factors.

Even if a snubber network (capacitor and resistor in series connection, not shown) would be provided across Q1, this would not adversely affect the monitoring and controlling circuits unless (1) the load impedance is so high that leakage currents caused by the snubber network are such that C1 charges up to the trigger voltage of TD or (2) the load becomes disconnected while the load voltage source remains connected.

In FIG. 2, the optocoupler Q5 may be connected in a Darlington configuration driving a standard transistor T6 with base resistor R6. This configuration may be used to make the circuit compatible with sensitive input solid state relays (containing Q1).

In the circuit of FIG. 2, the contacts of the circuit breaker CB are connected in series with the semiconductor power switch Q1. Depending upon the failure condition of Q1, the trigger diode is fired, turning on Q12, the circuit breaker CB is actuated, and its contacts cb open to interrupt the current path of Q1.

FIG. 2 shows a choice of connections A and B for the circuit breaker control coil CB. This is intended to make this circuit compatible with circuit breaker control coils which are rated for either intermittent duty (connection A) or continuous duty (connection B). The triac coupler Q12 will cycle on and off depending on the charge and discharge time constants for C1. Once the circuit breaker contacts cb interrupt the load current, there will be no voltage impressed across the load, and therefore no charging source for C1, which will, in turn, stop firing the optocoupler Q12.

Though solid state relays are a preferred field of application of the invention, it is not restricted thereto. Rather the power switch controlling the load can be either a semiconductor switch or an electromechanical switching means.

In addition, the load voltage can be either AC or DC, and also the input control signal can be AC or DC. For illustrating this, FIG. 3 shows a more generalized schematic, wherein the basic concept of the detector circuit is unchanged with respect to FIG. 1, but the load switching output circuit and the controlling input circuit are modified.

Figure 3:
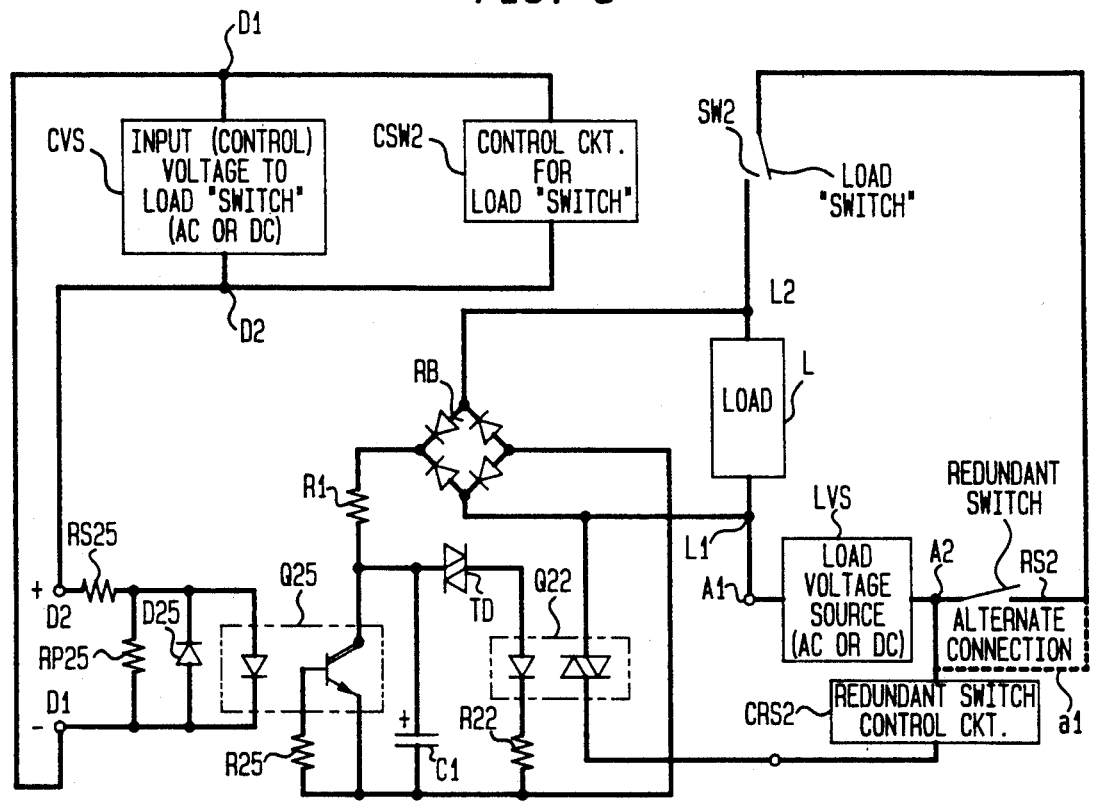
FIG. 3 is a schematic diagram of a circuit according to a third embodiment of the invention adapted for optional AC or DC control input and for AC or DC power supply voltage.

In FIG. 3, the components of the detector circuit, namely, the rectifier bridge RB, the trigger diode TD, and a charging impedance such as a resistor R1 and capacitor C1, have the same function as before and the same reference symbols.

A detector switching device, for example, an optocoupler Q25, which may be a Darlington phototransistor with a current limiting means, such as a resistor R25, has the same function as Q5 in FIGS. 1 and 2. An output optocoupler Q22 is similar in design and function to Q12 of FIG. 2.

In series with the load L, there is a load switch SW2 which is controlled by a control circuit CSW2. This switch SW2 may be a semiconductor switch or an electromechanical switch. The load L and switch SW2 are connected across a load voltage source LVS, which can be AC or DC, in series with a redundant switch RS2. A redundant switch control circuit CRS2 is connected to an output of Q22. The redundant switch RS2 is actuated, i.e. opened, when TD is fired by a trigger voltage at C1. The redundant switch RS2 is shown as being a mechanical contact which may be controlled by a control coil as CRS2, but can be also a semiconductor switch with appropriate wiring.

Figure 4:
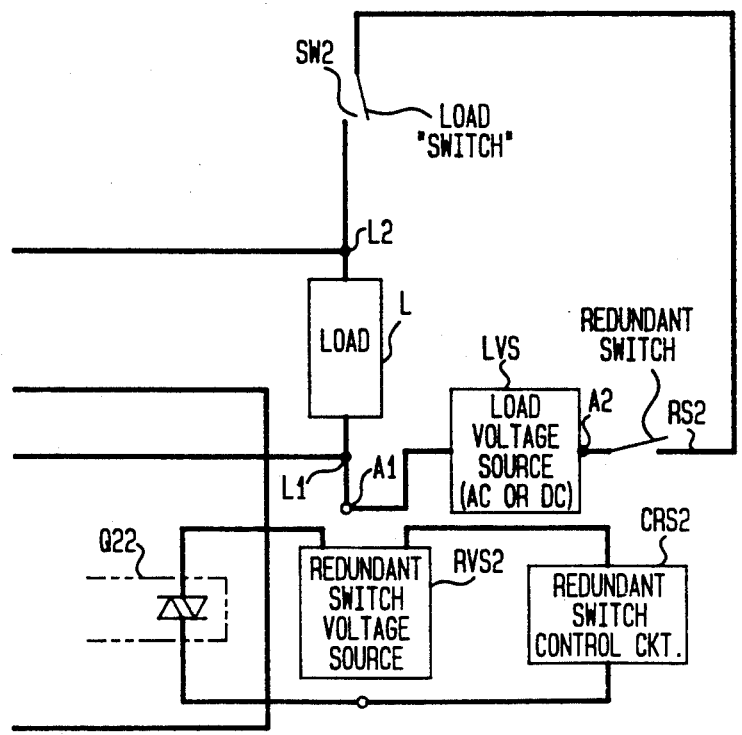
FIG. 4 is a variation of FIG. 3 showing a separate redundant switch voltage source (only load and redundant switch circuit shown).

The input circuits of FIGS. 1 and 2 are series-connected, current-controlled configurations. The input circuits of FIGS. 3 and 4 are parallel, voltage-controlled configurations. A pair of control input terminals D1 and D2 are shown in FIG. 3. A control circuit CSW2 is connected across D1 and D2, and in parallel with an input of Q25. The input LED of Q25 has a diode D25 connected in inverse parallel across the input LED of Q25. A parallel resistor RP25 and a series resistor RS25 act as a current limiting means. Specifically, the two resistors RS25 and RP25 make up a voltage divider which limits the LED current of Q25. The resistors will also establish voltage ranges over which the circuit would normally be operational. With a low supply voltage, the series-connected current-controlled configuration may cause a problem in that there may not be sufficient voltage available to actuate the relay. With the parallel voltage-controlled configuration, the voltage burden, which may be critical in a series connection like that shown in FIG. 1, is no longer of any concern.

If the power or load switch SW2 is an electromechanical contactor, the control circuit CSW2 m normally be operated by 120 volts AC, or even more, and the control coil might require up to several amps for normal operation. That level of current could damage the input of a series connected detector circuit like that of FIG. 1. With a parallel configuration, such as that of FIG. 3, the current to CSW2 (load switch) and the current to Q25 (monitor/redundant control circuit) take two separate, independent paths.

With regard to AC operation, if AC voltage from CVS is connected across terminals D1 and D2, during the half-cycle when terminal D2 is positive and terminal D1 is negative, the LED in Q25 is activated, and the output transistor of Q25 discharges the capacitor C1. During the alternate half-cycle, when terminal D1 is positive and terminal D2 is negative, the inverse-parallel (or anti-parallel) diode D25 is in conduction, and it protects the LED in Q25 from being reverse biased by more than several tenths of a volt. With an AC input applied, the time constant made up of R1 and C1 (rated properly) is so long that, even though the input LED is reverse biased every other half-cycle, the capacitor C1 cannot charge up to the firing voltage of TD in one half-cycle of the AC line frequency, so the monitoring-/redundant control device cannot react.

In the schematic of FIG. 3, the output line of Q22 is connected to one load terminal L1, thus using the load voltage source also for controlling the redundant switch. As shown in FIG. 3 the redundant switch control circuit CRS2 can be connected to the load voltage source either in parallel with the redundant switch RS2 (solid line) or with an alternate connection al (broken line) in series with RS2.

The redundant switch control circuit CRS2 also be connected to a separate voltage source RVS2, as sh part schematic in FIG. 4. The parts, which have been omitted in FIG. 4, are the same as in FIG. 3 and have the same function.

Finally, it should be pointed out that the part values can be found easily by a person skilled in the art so as to make the circuit work in the described way. Further, the person skilled in the art may make minor changes or improvements still using the basic concept of the claimed monitoring and redundant controlling circuit. For example, an "active current limiter" circuit could be substituted for the circuit made up of RS25 and RP25 in FIG. 3 to achieve a wide input voltage range.

By way of example, the following parts may be used to implement the circuit of FIG. 3:

RS25—16KΩ, 2 watt, resistor
RP25—1.5KΩ, ¼ watt, resistor
RB—4-1 amp, 1000 volt diodes
D25—1—1 amp, 1000 volt diode
Q25—Motorola MOC 8080 photo Darlington transistor
R25—47KΩ, ¼ watt, resistor
R1—100KΩ, 1 watt, resistor
C1—2 parallel connected 1 µF, 35 volt, capacitors or equivalent single capacitor
TD—Teccor HS-20 silicon trigger switch, graded to $I_{SW} < 40 \mu A$
Q22—Siemens IL-420 turn on device
R22—3KΩ, ¼ watt, resistor
LVS—120 volt AC source
CVS—120 volt AC source
CSW2 and SW2—Potter and Brumfield KRPA-1AG-120 electromechanical relay or Potter and Brumfield SSR-240A25 solid state relay
CRS2 and RS2—Potter and Brumfield ELG 2-1-240A50 relay These parts are only examples of what might be used to implement the invention of this application. Other parts are known to those skilled in the art which will be suitable for constructing circuits in accordance with the schematic diagrams of FIGS. 1-4 and which operate in accordance with the principles of this invention.

I claim

1. A monitoring and redundant control circuit for a load carrying power switch comprising:
    a pair of power supply terminals;
    a pair of load terminals;
    a power switch connected in series with a load connected across the load terminals, the series connection of the power switch and load being connected across the power supply terminals;
    a pair of control input terminals;
    control circuit means connected to the control input terminals for switching the power switch in response to a control signal at the control input terminals;
    interrupting means connected in series with the power switch and load terminals;
    a capacitor;
    threshold switch means connected between the capacitor and the interrupting means for discharging the capacitor to actuate the interrupting means to interrupt the connection between the power supply terminals and the load in response to the voltage power supply terminals and the load in response to the voltage across the capacitor exceeding a predetermined trigger voltage;
    detector switching means having an input coupled to the control input terminals and an output coupled to the capacitor, the detector switching means being responsive to the presence of the control signal at the control input terminals for providing a discharge path for the capacitor; and
    means for connecting the capacitor in a charge path so that the capacitor is charged when the absolute value of the voltage across the load is greater than the voltage across the capacitor across the load is greater than the voltage across the capacitor plus the voltage drop in the charge path and the capacitor is discharged only by the discharge path provided by the detector switching means when the control signal is present at the control input terminals or by the threshold switch means when the voltage across the capacitor exceeds the predetermined trigger voltage.

2. The circuit according to claim 1, in which the detector switching means includes an optocoupler, comprising a radiation emitter which is connected in series with the first and second control input terminals and a radiation receiver which controls a conducting path connected in parallel across the capacitor means.

3. The circuit according to claim 1, in which the detector switching device comprises an LED connected to the control input terminals and a diode connected in inverse parallel with the LED.

4. The circuit of claim 1, in which the detector switching means further comprises a resistor connected in parallel with the LED and a series resistor connected between one of the control input terminals and the LED, a control input across said control input terminals being selected from the group consisting of AC and DC voltage.

5. The circuit according to claim 1, in which the detector circuit comprises a rectifier bridge having a pair of input terminals connected across the load terminals and a pair of output terminals connected across a series connection of a resistor and the capacitor.

6. The circuit according to claim 1, in which the threshold switch mean includes a trigger diode having a trigger input connected to the capacitor.

7. The circuit according to claim 1, in which the interrupting means is selected from the group consisting of a fuse and an overcurrent circuit breaker connected in series with the load terminal, and the interrupting means in addition comprises a short circuiting switch connected across the load terminals, the short circuiting switch being controlled by the threshold switch means.

8. The circuit according to claim 7, in which the short-circuiting switch is a semiconductor switching device having a control input which is blocked until the capacitor is discharged by the threshold switch means.

9. The circuit according to claim 1, in which the interrupting means comprises a series connection of a detector output switch controlled by the threshold switch means and a circuit breaker control coil, the series connection being connected across the power supply terminals, a pair of contacts of the circuit breaker being connected in series with the power switch.

10. The circuit according to claim 1, in which the interrupting means comprises a redundant switch connected in series with the power switch and the load terminals across said power supply terminals, the redundant switch being controlled by a redundant switch control circuit which is controlled by the threshold switch means.

11. The circuit of claim 12, in which the redundant switch control circuit is connected to the output of a detector output switch, the input of which is controlled by the threshold switch means.

12. The circuit according to claim 13, in which the redundant switch control circuit and the detector output switch are connected to the power supply terminals.

13. The circuit according to claim 11, in which the redundant switch control circuit and the detector output switch are connected to a separate redundant switch voltage source.

14. The circuit according to claim 8 wherein said power supply terminals are to be connected optionally to an AC or DC voltage source and the power switch is a semiconductor power switch.

15. The circuit according to claim 7, in which the power supply terminals are connected to an AC voltage source and the power switch is a zero crossing switching device.

16. The circuit according to claim 1, in which the power switch is an electromechanical contactor, having contacts which are connected in series to the load terminals and a control coil which is connected across the control input terminals.

17. A monitoring and redundant control circuit for a load carrying power switch comprising:
    a pair of power supply terminals;
    a pair of load terminals;
    a load connected across the load terminals;
    a power switch connected in series with the load terminals and a redundant switch means across the power supply terminals;
    a pair of control input terminals;
    first and second optocouplers having input LEDs which are connected in series across the control input terminals, the first optocoupler having an output light receiving semiconductor means for switching the power switch in response to the presence of a control signal at the control input terminals, and the second optocoupler having an output light receiving semiconductor means connected across a capacitor for discharging the capacitor in response to the presence of the control signal at the control input terminals;

a rectifier bridge having a pair of input terminals connected to the load terminals and a pair of output terminals connected across a series connection of the capacitor and a resistor;

a trigger diode having a trigger input connected to a junction between the capacitor and the resistor; and detector output switch means having an input connected to the rectifier bridge and the trigger diode for short-circuiting the load terminals in response to a voltage on the capacitor exceeding a trigger voltage of the trigger diode.

18. The circuit of claim 17, in which:

the power switch is an AC operated semiconductor switch;

the detector output switch is a triac having main terminals connected across the load terminals and having a gate connected through a resistor to a first load terminal;

the input terminals of the rectifier bridge are connected across the gate and a second load terminal; and a thyristor controlled by an output terminal of the trigger diode is connected across the output terminals of the rectifier bridge.

19. A monitoring and redundant control circuit for a load carrying power switch comprising:

a pair of power supply terminals;
a pair of load terminals;
a load connected across the load terminals;
a power switch connected in series with the load terminals and a redundant switch across the power supply terminals;
a pair of control input terminals;
control circuit means connected across the control input terminals for switching the power switch in response to the presence of a control voltage at the control input terminals;
a first optocoupler having an input LED connected across the control input terminals;
the first optocoupler having an output semiconductor path connected across a capacitor;
a rectifier bridge having a pair of input terminals connected across the load terminals and a pair of output terminals connected across a series connection of the capacitor and a resistor;
a trigger device having a trigger input terminal connected to a junction between the capacitor and the resistor;
a second optocoupler having an input LED connected across a series connection of the capacitor and the trigger diode, an output current path of the second optocoupler being tied in series with a redundant switch control circuit so that the redundant switch is opened when a voltage across the capacitor exceeds a predetermined trigger voltage of the trigger diode.

20. The circuit of claim 19, in which the LED of the first optocoupler is connected in parallel with an antiparallel diode and a parallel resistor and in series with a series resistor across the control input terminals.

21. The circuit of claim 19, in which the first optocoupler has an input LED which is connected through an active current limiter across the control input terminals.

* * * * *

UNITED STATES PATENT AND TRADEMARK OFFICE
CERTIFICATE OF CORRECTION

PATENT NO. : 5,146,386
DATED : Sep. 8, 1992
INVENTOR(S) : Learned

It is certified that error appears in the above—identified patent and that said Letters Patent is hereby corrected as shown below:

<u>Column 7</u>

Line 37: delete "across the load is";
Line 38: delete "greater than the voltage across the capacitor";
Line 51: delete "means";
Line 54: delete "device" and substitute therefor --means--;
Line 65: delete "detector circuit" and substitute therefor --connecting means--.

Signed and Sealed this

Nineteenth Day of October, 1993

Attest:

BRUCE LEHMAN

Attesting Officer

Commissioner of Patents and Trademarks